Patented July 30, 1935

2,009,432

UNITED STATES PATENT OFFICE 2,009,432

RESINOUS COMPOSITIONS

Merlin Martin Brubaker, Wilmington, Del., and Raymond Einnon Thomas, Newburgh, N. Y., assignors to E. I. du Pont de Nemours & Company, Wilmington, Del., a corporation of Delaware No Drawing. Application May 3, 1932,
Serial No. 609,032

6 Claims. (Cl. 260—8)

This invention relates to new resinous compositions of the polyhydric alcohol-polybasic acid type, and more particularly to resins of this type improved by the incorporation of an amino acid into the reaction mixture of the resin ingredients.

This invention has as an object the production of new resins. A further object is the manufacture of the improved resins which are of especial utility in coating and in like compositions.

We have discovered that polyhydric alcohol-polybasic acid resins may be improved for certain purposes by the addition of an amino acid to the usual resin ingredients. It is preferred to employ a "balanced" formula, i. e., chemically equivalent proportions of the ingredients. The polybasic acids, e. g., phthalic, usually used in manufacturing resins of this type, are replaced in part by chemically equivalent amounts of either a monobasic or a polybasic amino acid. When a polybasic amino acid is included in the reaction mixture, however, this acid may constitute the whole of the polybasic acid used, although in general, more useful products are obtained when only a portion of the polybasic acid is replaced by the amino acid, and best results are obtained when the proportions of the ingredients are so chosen that 15–40% of the acid equivalents consist of amino acid or acids, while 60–85% consist of acids other than amino acids. The product, it is understood, is a resinous mixed ester of polyhydric alcohol and the several acids.

In carrying out the process of the present invention, the ingredients are heated together at any suitable temperature until resinification takes place. The preferred heat schedule is one hour up to 200° C. and 4 hours at 200° C., though this may vary between wider limits. In most cases, 3–8 hours heating at 200–250° C. covers the range necessary to produce resinification. Stirring and blowing with an inert gas are recommended to increase the rate of resinification and to offset a tendency of some of the amino acids to form dark products. Various modifying agents such as drying oil acids may be incorporated into the resin as will more fully appear hereinafter.

The following examples, in which the parts are by weight, are illustrative of the method of carrying out our invention. Eample I illustrates the preparation of a resin from a polyhydric alcohol and a polybasic amino acid.

Example I

Ninety-two parts glycerol and 220 parts glutamic acid are heated and stirred in a vessel fitted with a short air-cooled reflux condenser. The temperature is carried to 200° C. over a period of one hour, then maintained at this point for 5 hours, or until an acid number of 80 is obtained. The resin so obtained is dark in color, soft, practically odorless, and soluble in acetone and alcohol-hydrocarbon mixtures. The proportion of ingredients is the theoretical for glyceryl triglutamate.

It is generally more desirable to employ one or more monobasic or polybasic acids (other than amino acids) in conjunction with the polybasic amino acid. If desired, both additional types can be used, as in the following examples, which includes phthalic anhydride and drying oil acids:

Example II

Ninety-nine and four-tenths (99.4) parts glycerol, 155.8 parts linseed oil acids, 62.3 parts China-wood oil acids, 146.0 parts phthalic anhydride and 36.5 parts glutamic acid are heated to a temperature of 225° C. over a period of one hour. This temperature is maintained for 4 hours, or until an acid number of 14–15 is obtained. The resin is thinned with Hi-flash naphtha to a viscosity of 18 seconds in a No. 10 brass cup and cobalt drier added (0.05% metallic cobalt based on the oil). This varnish is suitable for spray or brush application over wood or steel.

Instead of polybasic amino acids, our resins can also be made with monobasic amino acids, such as glycocoll (amino acetic acid). In such cases it is again desirable to include other organic acids which do not have an amino group as resin ingredients. This is illustrated in the following example:

Example III

Thirty-five and one-tenth (35.1) parts glycocoll, 123.1 parts linseed oil acids, 49.3 parts China-wood oil acids, 79.8 parts glycerol, and 112.7 parts phthalic anhydride are heated and stirred in a vessel fitted with a short air-cooled reflux condenser, one hour up to 200° C. and three hours at 200° C. Acid number 6.

As the amino acid we may use the readily available varieties such as glutamic acid, aspartic acid and glycocoll (amino acetic acid). There are, however, other amino acids useful for the purposes of the present invention, such as the following: alanine, β-alanine, phenyl alanine, valine, leucine, isoleucine, homopiperidic acid, homoconiinic acid, α-amino stearic acid, diaminopropionic acid, lysine, serine, histidine, α-amino adipic acid, etc.

In addition to glycerol and phthalic anhydride, any of the other polyhydric alcohols or polybasic acids known to be useful in the manufacture of polyhydric alcohol-polybasic acid resins may be used in the manufacture of our new resins. Among the suitable alcohols there may be mentioned ethylene glycol and higher homologs, diethylene glycol and other polyglycols, triethanolamine, sorbitol, pentaerythritol, alkyl and aryl ethers of polyhydric alcohols having at least two free hydroxyl groups, for example monobenzylin and the diethyl ether of pentaerythritol. Suitable polybasic acids, in addition to phthalic anhydride, are adipic, succinic, maleic, tartaric, sebacic, citric, chlorophthalic, diphenic, trimesic, naphthalic, quinolinic, etc.

Modifying agents for our resins, in addition to the fatty oil acids previously mentioned, include monohydric alcohols, such as amyl, benzyl, and cyclohexyl; esters such as dibutyl phthalate, castor oil, linseed oil, cottonseed oil, coconut oil, and rosin glyceride; and other monobasic acids such as butyric, oleic, stearic, benzoic, salicylic, ricinoleic, cottonseed oil acids, soya bean oil acids, natural acidic gums (rosin, Kauri, Congo) and resinic acids (abietic acid); and monohydric ether alcohols such as the ethyl methyl, butyl, etc., ethers of ethylene, diethylene, etc. glycols, etc.

The resin ingredients may be reacted in various ways for the production of our new resins. Thus, the polyhydric alcohol and acid or acids having no amino group may be heated together and the amino acid introduced at a later stage, either continuously or in small portions; or the polyhydric alcohol and the amino acid may be heated together and the acid or acids having no amino group added at a later stage. Our new resins may also be prepared by reacting the ingredients in an inert solvent such as Hi-flash naphtha, provision being had for the removal of the water of reaction before returning the condensed solvent into the reaction vessel. In any of these different methods of making the resins, the other resin ingredients, such as the drying oil acids, may be added at any time during the progress of the reaction. With the possible exception of castor oil, however, it is preferred first to heat fatty oils with the glycerol or other polyhyric alcohol in the presence of an alcoholysis catalyst such as litharge until the two phases merge into a single phase and then heat the resulting mixture of mono- and di-acid glycerides (or equivalent esters of other polyhydric alcohols) with the remaining resin ingredients.

The resins obtained in accordance with the present process are valuable in the manufacture of protective coatings such as lacquers, enamels, and varnishes for wood or metal, and impregnating and coating compositions for wood, cloth, paper, felt, cellophane, etc. These resins are also useful in making insulating materials, for example with mica; molding compositions combined with the usual fillers; and impregnating agents for wood pulp, etc. They are also useful as cements and adhesives. As specific instances of their utility, there may be mentioned their use as an adhesive for cellulose acetate in the manufacture of laminated products and as the sandwiching material or adhesive therefor in the manufacture of safety glass.

For the above purposes, the new resins may be used in accordance with known methods. For example, in the formulation of coating compositions, we may include driers, antioxidants, oils, gums, bitumens, pigments, plasticizers, solvents, etc., as well as cellulose derivatives, such as nitrocellulose, cellulose acetopropionate, ethyl cellulose, and benzyl cellulose.

As many apparently widely different embodiments of this invention may be made without departing from the spirit and scope thereof, it is to be understood that we do not limit ourselves to the specific embodiments thereof except as defined in the following claims:

We claim:

1. A polyhydric alcohol-polybasic acid resin containing in combined form from 15% to 40% polyhydric alcohol ester of aminocarboxylic acid.

2. A glyceryl phthalate resin containing in combined form from 15% to 40% glyceride of aminocarboxylic acid.

3. The resin set forth in claim 1 in which the amino-carboxylic acid is a polybasic aminocarboxylic acid.

4. A resin containing in combined form polyhydric alcohol ester of a mixture of acids comprising an aminocarboxylic acid and a polycarboxylic acid free from amino groups, said resin comprising in combined form from 15% to 40% polyhydric alcohol ester of aminocarboxylic acid.

5. A resin containing in combined form the glyceride of a mixture of acids comprising aminocarboxylic acid and polybasic acid free from amino groups, said resin containing in combined form from 15% to 40% glyceride of aminocarboxylic acid.

6. A process of making amino acid modified polyhydric alcohol-polybasic acid resins which comprises including 15% to 40% aminocarboxylic acid in the reaction mixture of resin ingredients and heating until resinification takes place.

MERLIN MARTIN BRUBAKER.
RAYMOND EINNON THOMAS.